(12) United States Patent
Hadley (10) Patent No.: US 8,930,154 B2
(45) Date of Patent: Jan. 6, 2015

(54) FIRST AND SECOND VOLTAGE MEASUREMENTS TO ADJUST A VOLTAGE MEASURER

(75) Inventor: Ted A Hadley, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 13/355,315

(22) Filed: Jan. 20, 2012

(65) Prior Publication Data

US 2013/0024143 A1 Jan. 24, 2013

Related U.S. Application Data

(60) Provisional application No. 61/509,078, filed on Jul. 18, 2011.

(51) Int. Cl.
| G06F 21/72 | (2013.01) |
| G06F 13/16 | (2006.01) |
| H04L 9/32 | (2006.01) |
| G06F 21/54 | (2013.01) |
| G06F 21/75 | (2013.01) |
| H04L 9/08 | (2006.01) |
| G06F 1/24 | (2006.01) |
| G06F 21/57 | (2013.01) |
| G06F 12/14 | (2006.01) |
| G06F 21/60 | (2013.01) |
| G06F 21/55 | (2013.01) |

(52) U.S. Cl.
CPC .............. *G06F 13/1642* (2013.01); *H04L 9/32* (2013.01); *G06F 21/54* (2013.01); *G06F 21/75* (2013.01); *H04L 9/0816* (2013.01); *G06F 1/24* (2013.01); *G06F 21/57* (2013.01); *G06F 12/1433* (2013.01); *G06F 21/602* (2013.01); *G06F 21/55* (2013.01); *G06F 21/575* (2013.01); *G06F 21/72* (2013.01); *G06F 13/1663* (2013.01); *H04L 2209/12* (2013.01)
USPC ........................................ 702/64; 324/76.11

(58) Field of Classification Search
USPC ............ 702/64, 104, 182; 324/74, 76.11, 601
See application file for complete search history.

(56) References Cited

U.S. PATENT DOCUMENTS

| 6,424,143 | B1 | 7/2002 | Blossfeld et al. |
| 6,835,579 | B2 | 12/2004 | Elward |
| 7,130,752 | B2 * | 10/2006 | Yoshida et al. ................. 702/85 |
| 7,733,250 | B1 | 6/2010 | Tsyrganovich |
| 2006/0247873 | A1 * | 11/2006 | Fung et al. ...................... 702/64 |
| 2011/0095776 | A1 | 4/2011 | Yunoki |

FOREIGN PATENT DOCUMENTS

JP 2008192036 8/2008

* cited by examiner

*Primary Examiner* — Manuel L Barbee
(74) *Attorney, Agent, or Firm* — Caroline Pinkston (57) ABSTRACT

Examples disclose a processor with a measurement point to receive an input voltage and a voltage measurer to obtain a first voltage measurement. Further, the examples provide the processor with a switch, based on a signal, to enable a second voltage measurement at the measurement point. Additionally, the processor is to adjust the voltage measurer based on a difference between the first and second voltage measurements.

15 Claims, 5 Drawing Sheets

FIRST AND SECOND VOLTAGE MEASUREMENTS TO ADJUST A VOLTAGE MEASURER

CROSS-REFERENCE TO RELATED APPLICATIONS

This application claims priority to U.S. provisional patent application No. 61/509,078, filed on Jul. 18, 2011, which is hereby incorporated by reference in its entirety.

BACKGROUND

Processors have gained in sophistication with technological developments to create a more secure and useful environment. Security may be comprised when a party tampers with these processors. Additionally, these processors may be operating outside a range of acceptable tolerances, such as temperature and/or voltage which may cause issues with data corruption, unpredictable behavior, and even processor failure.

BRIEF DESCRIPTION OF THE DRAWINGS

In the accompanying drawings, like numerals refer to like components or blocks. The following detailed description references the drawings, wherein.

DETAILED DESCRIPTION

Processor security and tolerances may be monitored by measuring internal voltage. As such, measuring the internal voltage enables the processor to take the appropriate steps to prevent a security breach and/or possible failure. Internal voltage measurements may be taken at a point between the input voltage to the processor and a voltage measurer within the processor. This internal voltage measurement may be used to identify whether the processor is within tolerance. External measurements may identify a situation where the processor is deviating from a range of tolerances (i.e., outside a range of tolerances), yet the external measurement may not remedy the deviation in tolerance nor identify the source of the deviation. Further still, testing the internal voltage from an external measurement may identify that the security of the processor has been breached. However, providing continuous external access to the processor makes the processor more susceptible to tampering and/or attack.

To address these issues, example embodiments disclosed herein include obtaining a first and a second voltage measurement by utilizing a switch within a processor. The processor uses an internal voltage measurer to obtain the first voltage measurement at a measurement point within the processor. Once the switch receives a signal, the switch enables an external voltage measurer to obtain a second voltage measurement at the measurement point. Further, once obtaining the second voltage measurement, the processor adjusts the voltage measurer based on a difference between the first and the second voltage measurements.

Providing the switch to enable the second voltage measurement by connecting to the measurement point allows an external measurement of the internal voltage. Utilizing the switch enables the processor to disconnect the external measurement, making the processor less susceptible to attacks and/or tampering. Additionally, by obtaining the second voltage measurement of the internal voltage with an external voltage measurer, the second voltage measurement may be used as a guideline to determine a source of the deviation of the voltage and to adjust the voltage measurer internal to the processor. By adjusting the voltage measurer, the processor calibrates or adjusts the voltage measurer to provide a correction in the situation there is a deviation with the internal voltage. For example, in a situation the processor is within operating within the tolerance range (i.e., no deviations of voltage), the first voltage measurement should be similar to the second voltage measurement. However, in the case the first and the second voltage measurements are dissimilar, the second voltage measurement may be used to compensate the first voltage measurement by adjusting the voltage measurer for the difference between these voltage measurements.

In another embodiment, a voltage conversion module receives an internal characteristic of the processor, such as temperature, orientation, and/or voltage and converts this internal characteristic to the input voltage that is received by the measurement point. Converting the internal characteristic to the input voltage allows the processor to monitor various internal tolerances by measuring internal voltage. For example, the internal characteristic may be a sensor which measures temperature of the processor, thus this internal characteristic may be converted from the temperature to the input voltage which is measured at the measurement point. This enables the processor to monitor the internal characteristics to determine if it is operating outside of a range of tolerances or deviating from a specific voltage.

In a further embodiment, a second voltage measurer includes a voltage source external to the processor to provide a deviation in voltage to the measurement point and the voltage measurer internal to the processor reobtains the first voltage measurement. In this embodiment, the voltage source is providing a deviation to the processor to test if the processor accurately adjusted the internal voltage measurer. This provides a way to test the adjustment of the internal voltage measurer, thus this may be readjusted accordingly.

Yet, in a further embodiment, a comparator is utilized to compare the voltage measurements to identify the source of deviation with the internal voltage. For example, in an environment the processor is operating with no deviations, the first voltage measurement should have a similar voltage measurement to the input voltage and the first voltage measurement should have a similar voltage measurement to the second voltage measurement. In either of these situations, if both of these voltages are dissimilar, this indicates the source of the deviation of voltage is the input voltage and/or the first voltage measurement.

In summary, example embodiments disclosed herein provide a switch within a processor to enable an external measurement of the internal voltage making the processor less susceptible to attacks and/or tampering. Additionally, in adjusting the voltage measurer, the processor may identify a source and correct a deviation in the internal voltage. Providing an external measurement of the internal voltage enables a more accurate and predictable manner to monitor and test the internal voltage of the processor.

Figure 1:
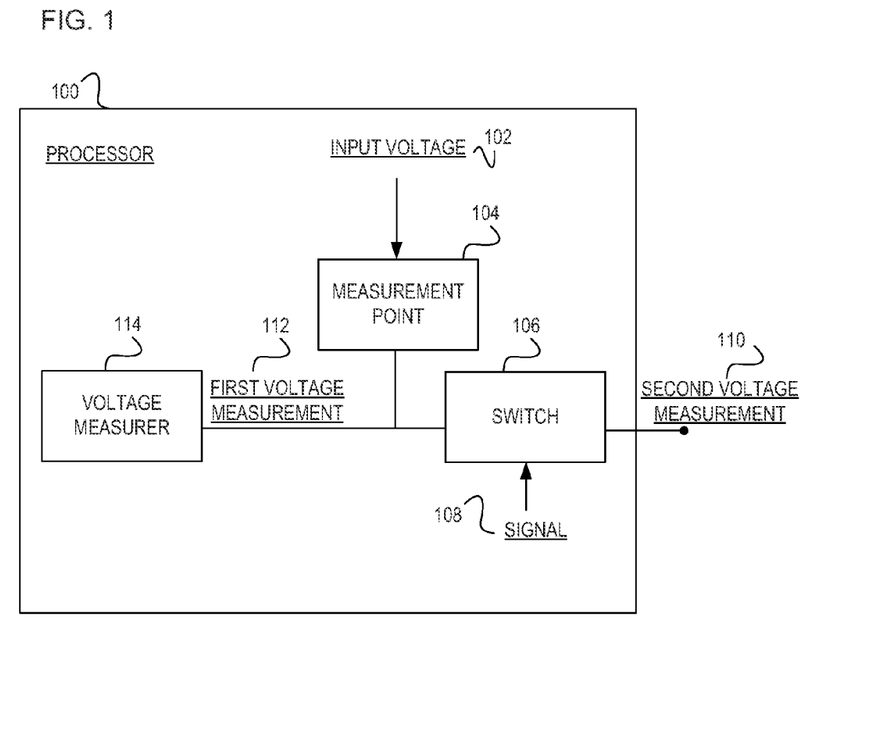
FIG. 1 is a block diagram of an example processor including a measurement point to receive an input voltage and a voltage measurer to take a first voltage measurement and switch to enable a second voltage measurement.

Referring now to the drawings, FIG. 1 is a block diagram of an example processor 100 including a measurement point 104 to receive input voltage 102, a voltage measurer 114 to obtain a first voltage measurement 112, and a switch 106 to receive a signal 108. Once the switch 106 receives the signal 108, a second voltage measurement 110 is obtained. The processor 100 adjusts the voltage measurer 114 based on a difference between the first voltage measurement 112 and the second voltage measurement 110. Enabling the switch 106 to connect to an external measurer to obtain the second voltage measurement 110, the processor 100 prevents a continuous connection to the external measurer, therefore reducing the susceptibility of the processor 100 to tampering and/or attacks. Embodiments of the processor 100 include an integrated circuit, chipset, electronic circuit, microprocessor, semiconductor, microcontroller, central processing unit (CPU), graphics processing unit (GPU), visual processing unit (VPU), or other programmable suitable to include components 104, 106, and 114.

The input voltage 102 is an internal voltage to the processor 100 received by the measurement point 104 and supplies electrical energy in the form of an electrical potential to the measurement point 104. Specifically, the input voltage 102 provides voltage to the processor 100 in order to perform various tasks, such as clock speeds, or logical functions. Embodiments of the input voltage 102 include a power management circuit, power supply, power source, energy storage, electromechanical system, or other device capable of delivering input voltage 102 to the measurement point 104 and/or processor 100. Although embodiments of the input voltage 102 in FIG. 1 depict 102 as internal to the processor 100, the input voltage 102 should not be limited to this embodiment as the input voltage 102 may also be received external to the processor 100. For example, the input voltage 102 may be voltage received from a power bus external to the processor 100. A further embodiment of the input voltage 102 includes the measurement point 104 receiving the input voltage 102 from a voltage conversion module. The voltage conversion module may monitor various internal characteristics of the processor 100 and as such converts the internal characteristic to the input voltage 102. In this embodiment, the processor uses the internal voltage measurement to monitor temperature, orientation, voltage, etc.

The measurement point 104 is a point or node internal to the processor 100 that receives the input voltage 102 for the first and second voltage measurements 112 and 110, respectively. Receiving the input voltage 102 enables the voltage measurements 112 and 110 to be measured at the measurement point 104. Specifically, the measurement point 104 is an area within the processor 100 that has a voltage potential across it as to enable a voltage measurement (i.e., the first voltage measurement 112 and the second voltage measurement 110). In another embodiment, an input resistor connects the input voltage 102 to the measurement point 104.

The voltage measurer 114 obtains the first voltage measurement 112 at the measurement point 104. Obtaining the first voltage measurement 112 at the measurement point 104, the processor 100 monitors its internal voltage. Further, the processor 100 adjusts the voltage measurer 114 based on a difference between the first and second voltage measurements 112 and 110, respectively. Adjusting the voltage measurer 114, the processor 100 calibrates the voltage measurer 114 to correct a deviation with the first voltage measurement 112. An embodiment of the voltage measurer includes an analog-to-digital converter (ADC) which converts the first voltage measurement 112 to a digital value proportional to the magnitude of the first voltage measurement 112. For example, the first voltage measurement 112 may be a continuous analog voltage signal between 0-2.5 volts, thus this signal may be converted to a digital value of 0 to represent 0 volts or 1 to represent 2.5 volts. Embodiments of the voltage measurer 114 include an analog-to-digital converter, voltmeter, multimeter, ammeter, potentiometer, oscilloscope, or other electronic device suitable to measure the first voltage measurement 112.

The first voltage measurement 112 is a measurement of the internal voltage of the processor 100. Specifically, the first voltage measurement 112 is taken at the measurement point 104 by the voltage measurer 114. The first voltage measurement 112 measures the voltage potential across the measurement point 104. Embodiments of the first voltage measurement 112 include an analog signal or digital signal representing the magnitude of the internal voltage.

The switch 106 receives the signal 108 and enables a connection to the measurement point 104. The switch 106 functions as a connection to an external measurer to obtain the second voltage measurement 110. Once receiving the signal 108 to connect, the switch 106 enables the second voltage measurement 110 at the measurement point 104. In one embodiment, the switch 106 closes to provide a physical connection between the measurement point 104 and an external voltage measurer to obtain the second voltage measurement 110. In this embodiment, the switch 106 remains disconnected to the measurement point 104 until receiving the signal 108 to connect. Additionally, in this embodiment, the switch 106 remains disconnected, making the processor 100 less susceptible to tampering. In another embodiment, the switch 106 operates to change the flow of current and/or voltage. For example, the switch 106 may have three electrical contacts, one connected to the measurement point 104, another connected to the external voltage measurer, and the third contact connected to ground. In this example, the switch 106 may change the direction of current and/or voltage from the first contact to third contact which directs the current and/or voltage to ground, thus not enabling the second voltage measurement 110. In keeping with this example, the first contact may direct the current and/or voltage to the second contact, thus enabling the second voltage measurement 110. Embodiments of the switch 106 include an electromechanical device, transistor, relay, or other device capable of connecting and disconnecting the measurement point 104 to enable the second voltage measurement 110. In a further embodiment, an output resistor connects the measurement point 104 to the switch 106.

The signal 108 is transmitted to the switch 106 which enables a connection to obtain the second voltage measurement 110. Specifically, the signal 108 communicates to the switch 108 to connect or direct the flow of current and/or voltage from the measurement point 104 to an external voltage measurer, the external measurer takes the second voltage measurement 110. Embodiments of the signal 108 include a communication, transmission, electrical signal, instruction, digital signal, analog signal, or other type of communication to instruct the switch 106 to enable the second voltage measurement 110. A further embodiment of the signal 108 includes a user-initiated request to obtain the second voltage measurement 110; another embodiment includes the processor 100 transmitting the signal 108 to indicate to instruct the switch 106 to connect to the measurement point 104 to obtain the second voltage measurement 110. For example, the processor 100 may communicate the signal 108 to the switch 106 in the situation the first voltage measurement 112 may deviate from an acceptable voltage range. In this example, the processor 100 monitors the internal voltage and if the internal voltage deviates from an accepted voltage range, the processor 100 enables a second voltage measurement 110 of the internal voltage using an external voltage measurer to correct and/or identify deviation in the internal voltage.

The second voltage measurement 110 is an internal voltage measurement of the processor 100 taken at the measurement point 104 by an external voltage measurer. The external voltage measurer obtains the second voltage measurement 110 as to provide an additional internal voltage measurement independent of the voltage measurer 114. In this regard, if there is a deviation of voltage, the processor 100 may adjust the voltage measurer 114 to correct the deviation or identify the source of the deviation. Based on a difference between the first and second voltage measurements 112 and 110, respectively, the processor 100 adjusts the voltage measurer 114. In this embodiment, the processor 100 may receive the second voltage measurement 110 and determines the difference between the first and second voltage measurements 112 and 110, respectively. In another embodiment, the processor converts the first voltage measurement 112 to a digital value and adjusts this digital value. In this embodiment, the digital value may be adjusted according to a calibration table or formula. In this embodiment, based on a difference between the first and second voltage measurements 112 and 110, respectively, the voltage measurer 114 is adjusted. Additionally, in this embodiment, the first voltage measurement 112 is converted to a digital value proportional to the magnitude of the first voltage measurement 112 by the voltage measurer 114. The digital value is then adjusted based on the difference between the first and second voltage measurements 110 and 112. For example, assume first voltage measurement 112 is around 4.2 volts and the second voltage measurement 110 is around 5.2 volts, as such the difference is 1.0 volt. Using the second voltage measurement 110 as a guideline, the voltage measurements indicate the voltage measurer 214 is measuring low by 1.0 volts. Thus voltage measurer 214 is adjusted by lowering it by 1.0 volts. In adjusting this value, the processor 100 may correct a deviation in the internal voltage. Embodiments of the second voltage measurement 110 include an analog signal or digital signal representing the magnitude of the internal voltage.

Figure 2:
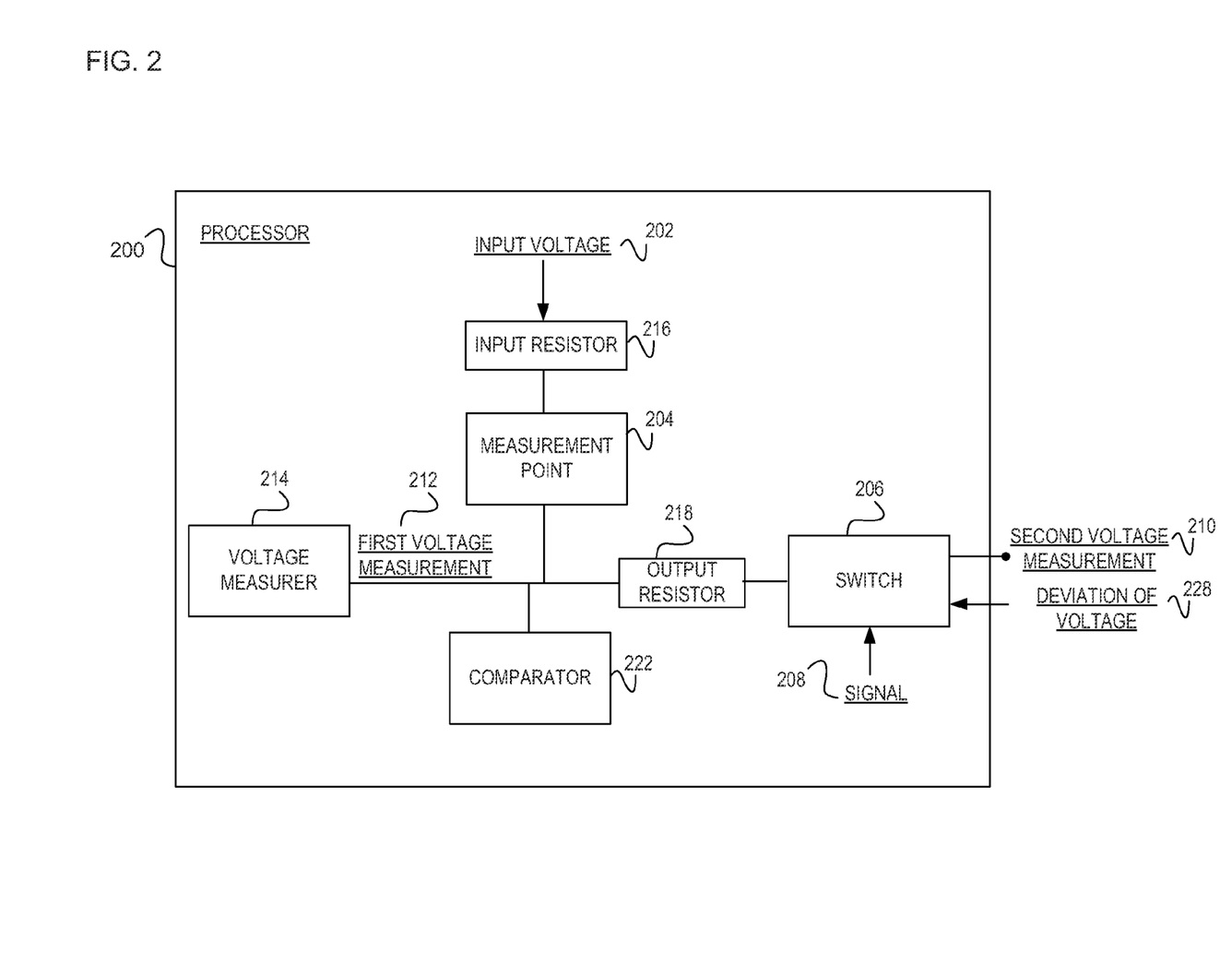
FIG. 2 is a block diagram of an example processor including an input resistor to connect an input voltage to a measurement point, an output resistor to connect the measurement point to a switch, and a comparator to compare a first voltage measurement and/or second voltage measurement.

FIG. 2 is a block diagram of an example processor 200 including an input resistor 216 and measurement point 204 to receive input voltage 202, a voltage measurer 214 to obtain a first voltage measurement 212, an input resistor 216, an output resistor 218, a comparator 222, and a switch 206 to receive a signal 208 to enable a second voltage measurement 210. The resistors 216 and 218 prevent damage to the processor 200 by limiting current. Additionally, the measurement point 204 may receive a deviation of voltage 228 through the switch 206 to test the adjustment of the voltage measurer 214. The processor 200 may be similar in functionality and structure to processor 100 of FIG. 1.

The input voltage 202 is provided through the input resistor 216 for the measurement point 204 to receive. In another embodiment, the input voltage 202 is from a voltage conversion module that receives an internal characteristic, such as the internal temperature of the processor 200. The internal characteristic is then converted to the input voltage 202. Converting the internal characteristics of the processor 200, these internal characteristics may be monitored using internal voltage measurements. Input voltage 202 may be similar in functionality and structure to input voltage 102 of FIG. 1.

The input resistor 216 is an electrical device to create an electrical resistance between the measurement point 204 and the input voltage 202. In one embodiment, the input resistor has at least two electrical contacts to connect the measurement point 204 and the input voltage 202. Embodiments of the input resistor 216 include a capacitor, resistor, inductor, or other electronic device capable of providing an electrical resistance between the measurement point 204 and the input voltage 202.

The measurement point 204 receives the input voltage 202 through the input resistor 216. The voltage measurer 214 obtains the first voltage measurement at the measurement point 204. Additionally, the second voltage measurement 210 is obtained at the measurement point 204. Measurement point 204 may be similar in functionality and structure to measurement point 104 of FIG. 1.

The first voltage measurement 212 is an internal voltage measurement taken at the measurement point 204 internal to the processor 200. First voltage measurement 212 may be similar in functionality and structure to first voltage measurement 112 of FIG. 1.

The voltage measurer 214 is internal to the processor 200 and obtains the first voltage measurement 212 at the measurement point 204. In another embodiment of the voltage measurer 214 continuously measures the first voltage measurement 212. The voltage measurer 214 may be similar in functionality and structure to voltage measurer 114 of FIG. 1.

The comparator 222 is an electrical device that compares at least two voltages to indicate a deviation with the voltage. In one embodiment, the comparator 222 compares the first voltage measurement 212 to the input voltage 202 to identify a deviation associated with the input voltage. In another embodiment, the comparator 222 compares the first voltage measurement 212 to the second voltage measurement 210 to identify a deviation with the voltage measurer 214. In a further embodiment, the comparator 222 may be considered part of the voltage measurer 214. In this embodiment, the comparator 222 receives the first voltage measurement 212, the input voltage 202, and the second voltage measurement 210 to identify a deviation with these voltages. Identifying a deviation with these voltages, the comparator 222 may identify the source of the deviation. Embodiments of the comparator 222 include an operational amplifier voltage comparator, integrated circuit, chipset, or electrical device capable of comparing voltages 202, 212, and 210.

The output resistor 218 is an electrical device to create electrical resistance between the measurement point 204 and the switch 206. In one embodiment, the output resistor 218 has at least two electrical contacts to connect the measurement point 204 to the switch 206. Embodiments of the output resistor 218 include a capacitor, resistor, inductor, or other electronic device capable of providing an electrical resistance between the measurement point 204 and the switch 206. The output resistor 218 may limit current to prevent damage to the internal components or circuitry of the processor 200 including the voltage measurer 214, measurement point 204, and/or switch 206.

The switch 206 receives the signal 208 and based on receiving this signal 208, the switch 206 connects the output resistor 218 to enable the second voltage measurement 210. The switch 206 may be similar in functionality and structure to switch 106 of FIG. 1.

The signal 208 is a communication received by the switch 206 to enable the second voltage measurement 210. The signal 208 may be similar in functionality and structure to signal 108 of FIG. 1.

The second voltage measurement 210 is an internal voltage measurement taken at the measurement point 204 by an external voltage measurer. Obtaining the second voltage measurement 210 enables external monitoring of the internal voltage of the processor 200. Additionally, the external monitoring of the internal voltage provides a voltage measurement independent voltage of the processor 200 to utilize to adjust the voltage measurer 214. In this embodiment, the external measurement of the second voltage measurement 210 is deemed the correct measurement and as such a deviating voltage may be corrected and the source of the deviation voltage identified. Further, the processor 200 adjusts the voltage measurer 214 based on a difference between the first and second voltage measurements 212 and 210, respectively. The second voltage measurement 210 may be similar in functionality and structure to second voltage measurement 110 of FIG. 1.

The deviation of voltage 228 is provided to the switch 206 is a voltage outside of a tolerance range to test the adjustment of the voltage measurer 214. For example, assume the tolerance range for the processor 200 to operate optimally is between 2.5-3.0 volts, thus the deviation of voltage 228 is an amount of voltage outside of the 2.5-3.0 volts, such as 2.4 volts or 3.1 volts. The deviation of voltage 228 is received at the measurement point 204 through the switch 206. In receiving the deviation of voltage 228 at the measurement point 204, the processor 200 may test the adjustment of the voltage measurer 214 by reobtaining the first voltage measurement 204. Testing the adjustment of the voltage measurer 214, allows a determination if the voltage measurer 214 is measuring the correct internal voltage and also enables a determination of whether the processor 200 is taking the appropriate response. For example, the deviation of voltage 228 may be a higher amount of voltage than the range of tolerances, thus the voltage measurer 214 takes the first voltage measurement 212 and the processor 200 should take the appropriate response, such as shutting down itself so the deviation of voltage 228 will not cause operational problems.

Figure 3:
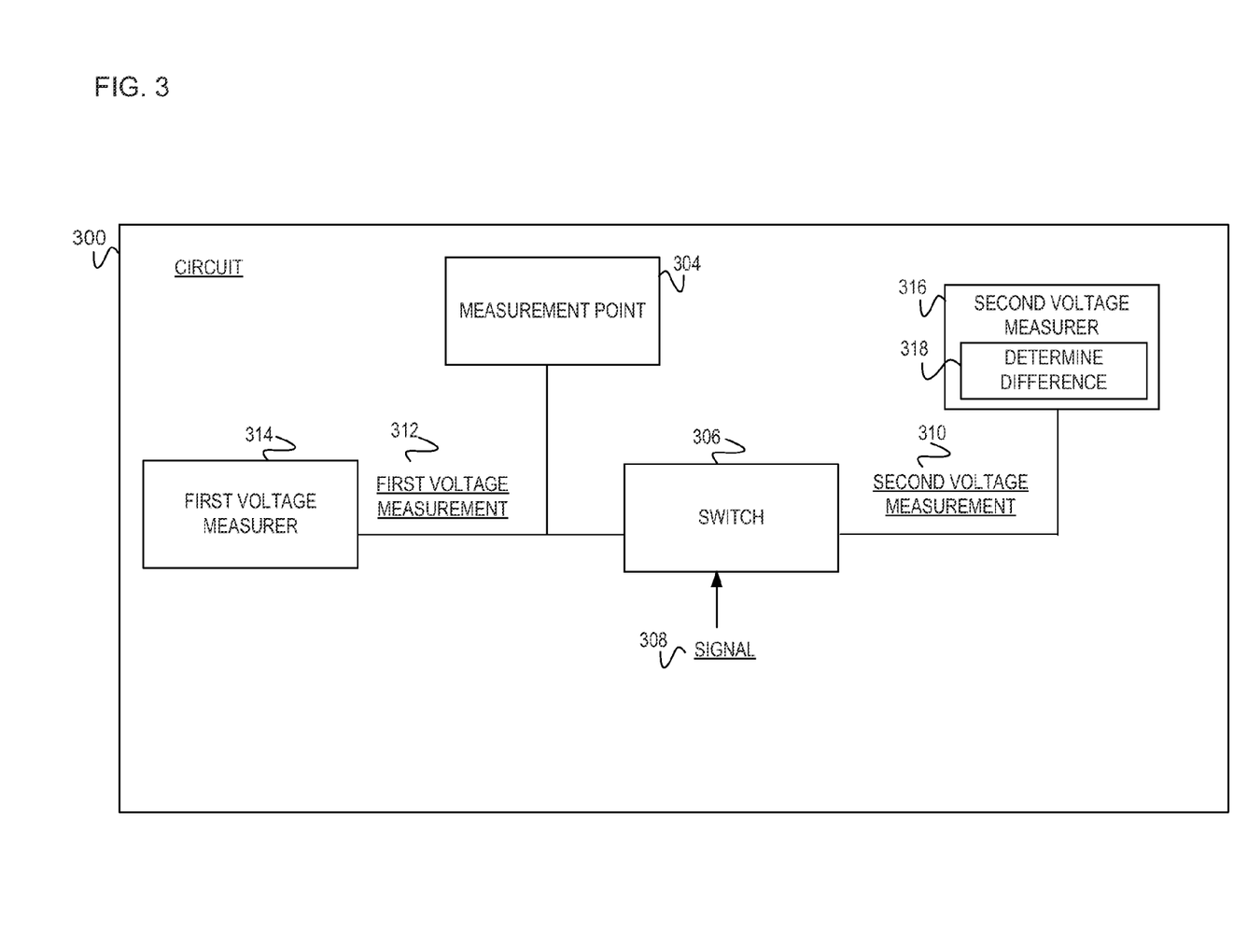
FIG. 3 is a block diagram of an example circuit including a first voltage measurer to obtain a first voltage measurement at a measurement point and a switch to enable a second voltage measurer to obtain a second voltage measurement.

FIG. 3 is a block diagram of an example circuit 300 to obtain a first voltage measurement 312 at a measurement point 304 by a first voltage measurer 314 and a switch 306 to receive a signal 308 to enable a second voltage measurement 310 by a second voltage measurer 316. Additionally, the circuit 300 determines a difference at module 318 between the first and second voltage measurements 312 and 310. The circuit 300 may be similar in functionality to processor 100 and 200 in FIG. 1 and FIG. 2, respectively. As such, embodiments of the circuit 300 include an integrated circuit, chipset, or other electronic circuit suitable to include components 304, 306, 314, and 316.

The measurement point 304 is the point to measure the internal voltage of the circuit 300. The internal voltage measurements (i.e., the first voltage measurement 312 and the second voltage measurement 310) are taken at the measurement point 304. In another embodiment, the measurement point 304 may receive an internal voltage as seen in other figures. The measurement point 304 may be similar in functionality and structure to the measurement point 104 and 204 of FIG. 1 and FIG. 2, respectively.

The first voltage measurement 312 is an internal voltage measurement of the circuit 300. The first voltage measurement 312 is measured at the measurement point 304 by the first voltage measurer 314. The first voltage measurement 312 may be similar in functionality and structure to the first voltage measurement 112 and 212 of FIG. 1 and FIG. 2, respectively.

The first voltage measurer 314 obtains the first voltage measurement 312 at the measurement point 304. The first voltage measurer 314 may be similar in functionality and structure to voltage measurer 114 and 214 of FIG. 1 and FIG. 2, respectively. As such, embodiments of the first measurer 314 include an analog-to-digital converter, voltmeter, multimeter, ammeter, potentiometer, oscilloscope, or other electronic device suitable to obtain the first voltage measurement 312.

The switch 306 receives the signal 308 to connect the measurement point 304 to the second voltage measurer 316 to enable the second voltage measurement 310. In one embodiment, the switch 306 closes to provide a physical connection, while in another embodiment, the switch 306 operates to change the flow of current and/or voltage. For example, the switch 306 may have three electrical contacts, one connected to the measurement point 304, another connected to the second voltage measurer 316, and the third contact connected to ground. In this example, the switch 306, may change the direction of the current and/or voltage from the first contact to the third contact which directs the current and/or voltage to ground, thus not enabling a second voltage measurement 310 at the measurement point 304. In keeping with this example, the first contact may direct the current and/or voltage to the second contact, thus enabling the second voltage measurement 310. The switch 306 may be similar in functionality and structure to switch 106 and 206 of FIG. 1 and FIG. 2, respectively.

The signal 308 is an electronic communication sent to the switch 306 as to instruct the switch 306 to connect the measurement point 304 and the second voltage measurer 316. Once the switch 306 receives the signal 308, this enables the second voltage measurement 310 by the second voltage measurer 316. The signal 308 may be similar in functionality and structure to signal 108 and 208 of FIG. 1 and FIG. 2, respectively.

The second voltage measurement 310 is an internal voltage measurement of the circuit 300 at the measurement point 304 taken by the second voltage measurer 316. The second voltage measurement 310 may be similar in functionality and structure to second voltage measurement 110 and 210 of FIG. 1 and FIG. 2, respectively.

The second voltage measurer 316 is an electronic device that measures the internal voltage of the circuit 300 at the measurement point 304. Specifically, the second voltage measurer 316 obtains the second voltage measurement 310 at the measurement point 304. In another embodiment, the second voltage measurer 316 is considered as a voltage measurer external to a processor as in FIG. 1 and FIG. 2. Embodiments of the second voltage measurer 316 include an analog-to-digital converter, voltmeter, multimeter, ammeter, potentiometer, oscilloscope, or other electronic device suitable to measure the second voltage measurement 310.

Module 318 determines the difference between the first and second voltage measurements 312 and 310 and based on the difference, the first voltage measurer 314 is adjusted to correct a deviation with the first voltage measurement 312. Embodiments of module 318 include a set of instructions executable by a processor to determine the difference between the first and second voltage measurements 312 and 310, while other embodiments include an electronic device operating in conjunction with the second voltage measurer 316 to determine the difference. In another embodiment, this difference is transmitted to the first voltage measurer 314 to adjust it. For example, assume the first voltage measurement is 2.0 volts and the second voltage measurement is 3.1 volts, as such module 318 determines the difference as 1.1 volts. The 1.1 volts indicates the first voltage measurer is reading lower than 1.1 volts and as such this difference is transmitted to the first voltage measurer 314 and adjusted by adding 1.1 volts to future first voltage measurements 312. In a further embodiment, the first voltage measurement 312 is converted to a digital value and the digital value is adjusted. In keeping with the previous example, the difference of 1.1 volts is transmitted to the first voltage measurer 314 and adjusts the first voltage measurement 312 by increasing the measurement 312 by 1.1 volts.

Figure 4:
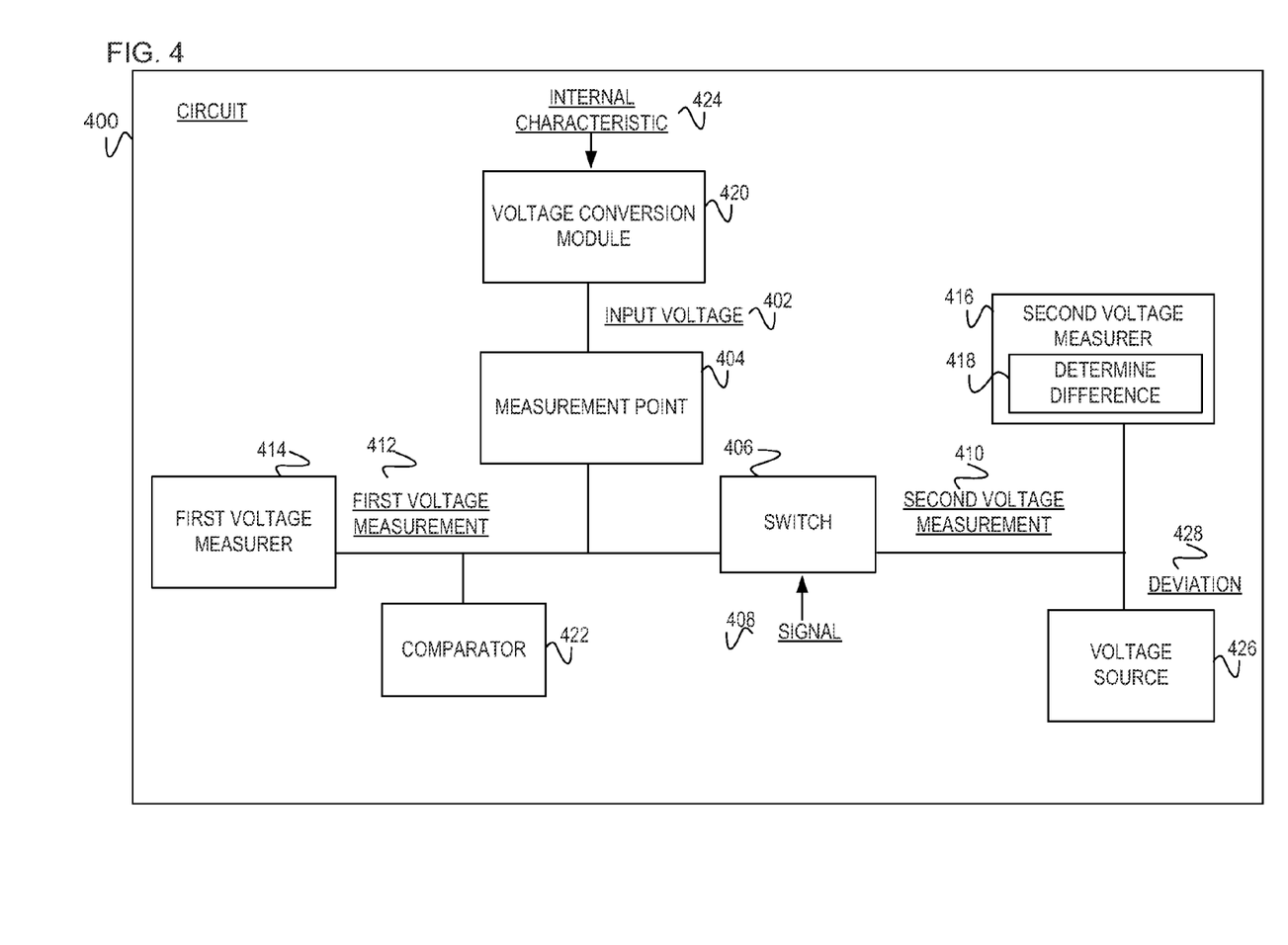
FIG. 4 is a block diagram of an example circuit including a measurement point to receive an input voltage from a voltage conversion module and a first and a second voltage measurers to obtain a first and a second voltage measurements.

FIG. 4 is a block diagram of an example circuit 400 including a voltage conversion module 420 for receiving an internal characteristic 424 of the circuit 300 to convert to an input voltage 402 received at a measurement point 404. Additionally, the circuit 400 includes a first voltage measurer 414 to obtain a first voltage measurement 412 at the measurement point 404 and a switch 406 to receive a signal 408 to connect a second voltage measurer 416 to the measurement point 404 that enables a second voltage measurement 410. Further, the circuit 400 includes a comparator 422 and voltage source 426. The circuit 300 may be similar in functionality to processor 100 and 200 of FIG. 1 and FIG. 2, respectively, and similar in functionality and structure to circuit 300 of FIG. 3.

The internal characteristic 424 is a measured characteristic of the circuit 300. Embodiments of the internal characteristic 424 include temperature, orientation, and/or voltage. In another embodiment the internal characteristic 424 is measured internally of a processor.

The voltage conversion module 420 is an electrical device that receives the internal characteristic 424 and converts 424 into the input voltage 402. Converting the internal characteristic 424 to the input voltage 402, the voltage conversion module 420 may monitor various internal characteristics 424 of the circuit 400. In this embodiment, the processor uses the internal voltage measurement to monitor temperature, orientation, voltage, etc. This enables the circuit 400 to monitor the internal characteristics to determine if 400 is operating outside of a range of tolerances. Embodiments of the voltage conversion module 420 include a device capable of receiving an analog signal to convert to the input voltage 402, other embodiments include a sensor to receive the internal characteristic 424 to convert into the input voltage 402.

The input voltage 402 is converted from the internal characteristic 424 of the circuit 400 at the voltage conversion module 420. Input voltage 402 may be similar in functionality and structure to input voltage 102 and 202 of FIG. 1 and FIG. 2, respectively.

The measurement point 404 is a point within the circuit 400 that receives the input voltage 402. Additionally, the first voltage measurement 412 and the second voltage measurement 410 are internal voltage measurements taken at the measurement point 404. Measurement point 404 may be similar in functionality and structure to measurement point 104, 204, and 304 of FIGS. 1-3.

The first voltage measurement 412 is an internal voltage measurement of the circuit 400 at the measurement point 404 by the first voltage measurer 414. First voltage measurement 412 may be similar in functionality and structure to the first voltage measurement 112, 212, and 312 of FIGS. 1-3.

The first voltage measurer 414 obtains the first voltage measurement 412 at the measurement point 404. First voltage measurer 414 may be similar in functionality and structure to voltage measurer 114 and 214 and first voltage measurer 314 of FIGS. 1-3.

The comparator 422 is an electrical device that compares voltages to indicate a deviation with the voltages. In one embodiment, the comparator 422 compares the first voltage measurement 412 to the input voltage 402 to identify a deviation associated with the input voltage 402. In another embodiment, the comparator 422 compares the first voltage measurement 412 to the second voltage measurement 410 to identify a deviation associated with the voltage measurer 414. Comparing these voltage measurements 402, 410, and 412 sources of deviations in voltage may be identified. Comparator 422 may be similar in functionality and structure to compactor 222 of FIG. 2.

The switch 406 enables the second voltage measurer 416 to obtain the second voltage measurement 410. Switch 406 may be similar in functionality and structure to switch 106, 206, and 306 of FIGS. 1-3.

The signal 408 is transmitted to the switch 406 to enable the second voltage measurer 416 to obtain the second voltage measurement 410. Signal 408 may be similar in functionality and structure to signal 108, 208, and 308 of FIGS. 1-3.

The second voltage measurement 410 is an internal voltage measurement of the circuit 400 taken at the measurement point 404. Second voltage measurement 410 may be similar in functionality and structure to second voltage measurement 110, 210, and 310 of FIGS. 1-3.

The second voltage measurer 416 obtains the second voltage measurement 410 at the measurement point 404 once the switch 406 connects to the second voltage measurer 416 and the measurement point 404. Second voltage measurer may be similar in functionality and structure to second voltage measurer 316 of FIG. 3.

The module 418 determines a difference between the first and second voltage measurements 412 and 410 and based on this difference, the circuit 400 adjusts the first voltage measurer 414. Module 418 may be similar in functionality to module 318 of FIG. 3.

The deviation 428 of voltage is provided by the voltage source 426 through the switch 406 to the measurement point 404. The deviation 428 is a voltage outside of a tolerance range of voltages to test the adjustment of the first voltage measurer 414. The deviation 428 may be similar in functionality to deviation of voltage 228 of FIG. 2.

The voltage source 426 connected to the second voltage measurer 416 provides the deviation 428 in voltage to the measurement point 404. Providing the deviation 428 allows a test of the adjustment of the first voltage measurer 414. In this embodiment, the first voltage measurer 414 is to reobtain the first voltage measurement 412; this allows the circuit 400 to determine whether the first voltage measurer 414 was correctly adjusted. Embodiments of the voltage source 426 include a power management device, power supply, voltage supply, energy storage, electromechanical system, solar power, or other device capable of providing voltage to the measurement point 404.

In a further embodiment of FIG. 4, the first voltage measurer 414 may be connected to a multiplexer to monitor more than one internal characteristic 424 of the circuit 400. In this embodiment, the internal characteristics 424 such as temperature, voltage, and orientation may be monitored concurrently. Additionally, in this embodiment, the other components internal to the circuit 400 include more than one component within the circuit 400, such as the voltage conversion module 420, the input voltage 402 the measurement point 404, the first voltage measurement point, the switch 406, the second voltage measurer 416, and the second voltage measurement 410 to monitor each internal characteristic 424.

Figure 5:
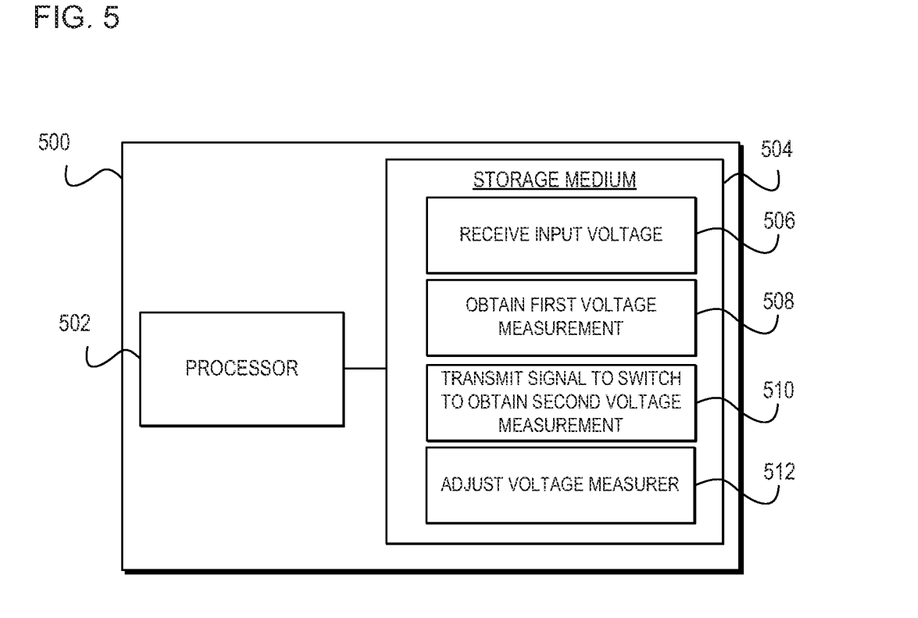
FIG. 5 is a block diagram of a computing device to receive an input voltage and obtain a first voltage measurement and adjust a voltage measurer.

FIG. 5 is a block diagram of an example computing device 500 for obtaining a first and second voltage measurements and adjusting a voltage measurer. Although the computing device 500 includes processor 502 and machine-readable storage medium 504, it may also include other components that would be suitable to one skilled in the art. For example, the computing device 500 may include storage and/or memory. Embodiments of the computing device 500 include a client device, personal computer, desktop computer, laptop, a mobile device, or other computing device suitable to include components 502 and 504.

The processor 502 may fetch, decode, and execute instructions 504, 506, 508, 510, and 512. Processor 502 may be similar in functionality and structure of the processor 100 and 200 as above in connection with FIG. 1. and FIG. 2, respectively. Specifically, the processor 502 executes: receiving an input voltage at a measurement point instructions 506, obtain a first voltage measurement at the measurement point instructions 508, transmit a signal to enable a switch to connect the measurement point to a second voltage measurer to obtain a second voltage measurement instructions 510, and adjust the first voltage measurer based on a difference between the first and the second voltage measurements instructions 512.

The machine-readable storage medium 504 may include instructions 506, 508, 510, and 512 for the processor 502 to fetch, decode, and execute. The machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

Instructions 506 include the measurement point internal to the processor 502 receiving input voltage. The measurement point receiving the input voltage at instructions 502 enables the voltage measurer to obtain the first voltage measurement at instructions 508.

Instructions 508 include a voltage measurer internal to the processor 502 to obtain the first voltage measurement. Embodiments of instructions 508 include continuously measuring the first voltage measurement while other embodiments of instructions 508 include measuring the first voltage measurement during specified time periods.

Instructions 510 include the signal transmitted to the switch internal to the processor 502 to connect to the measurement point. Enabling the connection to the measurement point at instructions 510, a voltage measurer external to the processor 502 may obtain the second voltage measurement.

Instructions 512 include adjusting the voltage measurer internal to the processor 502 based on a difference between the first and second voltage measurements. The voltage measurer internal to the processor 502 obtained the first voltage measurement at instructions 508. An embodiment of instructions 512 includes utilizing an analog-to-digital converter and converting the first voltage measurement to a digital value and then adjusting the digital value based on the difference between the first and second voltage measurements.

The embodiments described in detail herein provide a switch within a processor to enable an external measurement of the internal voltage making the processor less susceptible to attacks and/or tampering. Further, providing an external measurement of the internal voltage enables a more accurate and predictable manner to monitor and test the internal voltage of the processor. Still further, the processor may respond in a pro-active manner to correct a deviation in the internal voltage by adjusting the voltage measurer.

I claim:

1. A processor comprising:
   a measurement point within the processor to receive an input voltage;
   a voltage measurer to obtain a first voltage measurement at the measurement point; and
   a switch to enable, based on a signal, a second voltage measurement at the measurement point;
   wherein the processor is to adjust the voltage measurer based on a difference between the first voltage and the second voltage measurements.

2. The processor of claim 1, further comprising:
   an input resistor to connect the input voltage to the measurement point; and
   an output resistor to connect the measurement point to the switch, the output resistor preventing damage to the processor by limiting a current.

3. The processor of claim 1, further comprising:
   a comparator to perform at least one of:
      compare the first voltage measurement to the input voltage to identify a deviation associated with the input voltage; and
      compare the first voltage measurement to the second voltage measurement to identify a deviation with the voltage measurer.

4. The processor of claim 1, further comprising:
   a voltage conversion module to receive an internal characteristic of a circuit and convert the internal characteristic to the input voltage to enable the processor to monitor the internal characteristic by determining if there is a deviation in the input voltage; and
   wherein the measurement point receives the input voltage from the voltage conversion module.

5. The processor of claim 1, further comprising:
   the measurement point to receive a deviation of voltage through the switch to test the adjustment of the voltage measurer; and
   the voltage measurer is additionally to reobtain the first voltage measurement at the measurement point.

6. The processor of claim 1, wherein to adjust the voltage measurer includes converting the first voltage measurement to a digital value and adjusting the digital value to correct a deviation with the first voltage measurement.

7. The processor of claim 1, wherein the voltage measurer includes an analog to digital converter (ADC).

8. A circuit, comprising:
   a first voltage measurer to obtain a first voltage measurement at a measurement point within the circuit;
   a switch to receive a signal to enable a connection from the measurement point to a second voltage measurer; and
   the second voltage measurer to:
      obtain a second voltage measurement at the measurement point; and determine a difference between the first voltage and the second voltage measurements to adjust the first voltage measurer to correct a deviation with the first voltage measurement.

9. The circuit of claim 8, wherein the first voltage measurer includes an analog to digital converter and the second voltage measurer includes a voltmeter.

10. The circuit of claim 8 further comprising:
a voltage source connected to the second voltage measurer to test the adjustment of the first voltage measurer by providing a deviation of voltage to the measurement point; and
the first voltage measurer is additionally to reobtain the first voltage measurement at the measurement point.

11. The circuit of claim 8, further comprising:
a comparator to perform at least one of:
compare the first voltage measurement to an input voltage to identify a deviation associated with the input voltage; and
compare the first voltage measurement to the second voltage measurement to identify a deviation associated with the first voltage measurer.

12. The circuit of claim 8, further comprising:
the measurement point to receive an input voltage from a voltage conversion module; and
the voltage conversion module to receive an internal characteristic of the circuit and convert the internal characteristic to the input voltage to enable the circuit to monitor the internal characteristic by determining if there is a deviation in the input voltage.

13. A non-transitory computer-readable medium encoded with instructions executable by a processor of a computing device, the storage medium comprising instructions to:
obtain a first voltage measurement at a measurement point within the processor by a first voltage measurer;
transmit a signal to enable a switch to connect the measurement point to a second voltage measurer to obtain a second voltage measurement at the measurement point; and
based on a difference between the first voltage and the second voltage measurements, adjust the first voltage measurer.

14. The non-transitory computer-readable medium of claim 13, wherein to adjust the first voltage measurer includes converting the first voltage measurement to a digital value and adjusting the digital value to correct a deviation with the first voltage measurement.

15. The non-transitory computer-readable medium of claim 13, further comprising instructions to:
receive an input voltage at the measurement point from a voltage conversion module to enable the processor to monitor an internal characteristic.

* * * * *